United States Patent
Pizzato et al.

(10) Patent No.: US 12,180,747 B2
(45) Date of Patent: Dec. 31, 2024

(54) SAFETY SWITCH WITH TOUCH PANEL FOR MONITORING ACCESS TO MACHINES OR INDUSTRIAL PLANTS

(71) Applicant: PIZZATO ELETTRICA S.R.L., Marostica (IT)

(72) Inventors: Marco Pizzato, Marostica (IT); Simone Zonta, Bassano del Grappa (IT)

(73) Assignee: PIZZATO ELETTRICA S.R.L., Marostica (IT)

( * ) Notice: Subject to any disclaimer, the term of this patent is extended or adjusted under 35 U.S.C. 154(b) by 354 days.

(21) Appl. No.: 17/624,860

(22) PCT Filed: Jun. 30, 2020

(86) PCT No.: PCT/IB2020/056193
§ 371 (c)(1),
(2) Date: Jan. 5, 2022

(87) PCT Pub. No.: WO2021/009602
PCT Pub. Date: Jan. 21, 2021

(65) Prior Publication Data
US 2022/0251876 A1   Aug. 11, 2022

(30) Foreign Application Priority Data

Jul. 12, 2019  (IT) .................. 102019000011694

(51) Int. Cl.
*E05B 47/00*   (2006.01)
*E05B 39/00*   (2006.01)
*G05B 19/406*  (2006.01)

(52) U.S. Cl.
CPC .......... *E05B 47/0001* (2013.01); *E05B 39/00* (2013.01); *G05B 19/406* (2013.01);
(Continued)

(58) Field of Classification Search
CPC ................. E05B 47/0001; E05B 39/00; E05B 2047/0068; G05B 19/406; G05B 2219/31437
See application file for complete search history.

(56) References Cited

U.S. PATENT DOCUMENTS

| 8,922,333 B1 * | 12/2014 | Kirkjan | G07C 9/00309 340/5.1 |
| 2005/0179517 A1 * | 8/2005 | Harms | G07F 5/26 70/277 |

(Continued)

*Primary Examiner* — Mark A Williams
(74) *Attorney, Agent, or Firm* — Rivka Friedman (57) ABSTRACT

A safety switch comprises a switching device having a casing housing electric and/or electronic control means adapted to be connected with one or more circuits, an operating device adapted to be anchored to a movable part of the access to interact with the switching means when the access is opened/closed for the opening/closure of the circuits, means for detecting the opening of the access associated with the switching device and with the operating device for sending a stop command of the machine or plant upon the detection or request for the opening of the access, driving means for sending activation/deactivation and/or signalling controls and that comprise a touch monitor provided with one or more virtual controls and at least one microprocessor suitable for associating the virtual controls with a control and/or signalling function.

10 Claims, 7 Drawing Sheets

(52) U.S. Cl.
    CPC ............... *E05B 2047/0068* (2013.01); *G05B 2219/31437* (2013.01)

(56) References Cited

U.S. PATENT DOCUMENTS

| | | | | |
|---|---|---|---|---|
| 2012/0169072 A1* | 7/2012 | Maguire | ............ | G07C 9/00912 292/336.3 |
| 2015/0259949 A1* | 9/2015 | Cheng | ................... | E05B 47/026 292/144 |
| 2015/0267438 A1* | 9/2015 | Martinez | ............ | G07C 9/00182 70/278.1 |
| 2016/0145899 A1* | 5/2016 | Henderson | ......... | G07C 9/00563 70/101 |
| 2016/0348398 A1* | 12/2016 | Telljohann | .............. | G08B 13/08 |
| 2020/0311972 A1* | 10/2020 | Love | ......................... | G06T 7/74 |

\* cited by examiner

SAFETY SWITCH WITH TOUCH PANEL FOR MONITORING ACCESS TO MACHINES OR INDUSTRIAL PLANTS

TECHNICAL FIELD

The present invention finds application in the sector of electrical devices for industrial use and in particular relates with a safety switch associated with a touch panel and adapted to be applied to barriers or protection panels for the monitoring the access to machines or industrial plants.

STATE OF THE ART

As is known, the access to machines or industrial plants requires constant surveillance through the provision of means that prevent voluntary or accidental entry within the operating perimeter by operators.

For this purpose, the accesses such as barriers, perimeters and protection panels are generally provided with one or more safety devices connected to the power supply circuit of the machine or plant, as well as possibly to auxiliary service circuits, in order to allow the access inside the perimeter only after the stop of the machine or plant or of the dangerous parts, constantly reporting both the operating status of the machine or plant and any anomalies that may affect any part of the plant.

The safety degree of these devices must be the higher the greater is the risk they will face if an operator enters the perimeter with the machine or plant still operative.

Generally, the safety switches comprise a switching device designed to be anchored to the fixed part of the barrier and which houses the various circuits suitable for being connected to the power supply and/or service circuits of the machine or plant in order to determine its opening/closing or to send signals, depending on commands from outside.

An operating device is instead fixed on the movable part and has the task of interacting with the switching device in order to generate the various signals indicating the closed access status, also preventing the opening of the access if the predefined safety conditions for the specific machine or system are not satisfied.

The switching device is usually also equipped with mechanical, electronic or electromechanical means designed to prevent access from being opened in unsafe conditions or by unauthorized persons.

A particular type of access control devices are the safety handles, i.e. devices that allow access to be opened and closed, at the same time allowing the plant to be stopped, or only part of it, at the time of the opening of the access or simply of the unlocking thereof.

An example of a safety handle is disclosed in US2005/108945, wherein the handle comprises magnetic sensor means which detect the opening of the access to control the consequent opening of the power circuit and the consequent plant shutdown.

Another example of a safety handle for access control is disclosed in DE102009039591, wherein the handle is associated with operative means suitable for interacting with an operating device associated with the fixed part of the access.

Generally, these handles comprise a main body formed by an anchoring bracket fixed to the frame of the movable part of the access and a body or casing which can also have the function of a handle, in turn fixed to the bracket.

For example, in EP2264353, in the name of the present Applicant, the handle comprises an anchoring bracket fixed to the movable part of the access and on which a handle integral with a key actuator slides to interact with switch means associated with the fixed part of the access.

The fixing of the handle of the main body to the movable part of the access is carried out by means of common fixing elements, such as screws, pins, snap means, which can be inserted both frontally and posteriorly or laterally to the body, also according to the conformation of the handle.

A further example of such handles is disclosed in EP2112674, always in the name of the present Applicant.

Generally, the known safety handles are designed to interact with a switching device mounted on the fixed frame of the access to be monitored so that a pin interacts with the locking/unlocking means described above to be locked and not allow opening of access in unsafe conditions of machine or system.

Generally, regardless of the particular configuration of the operating device, for example provided or not with a handle or grasping element, the switching device, in addition to being used to lock the operating device, can be provided or in any case associated with a push-button panel having one or more controls, such as pushbuttons and/or selectors, suitable for intervening on the power supply circuit and/or on additional auxiliary circuits following activation by an operator, based on the specific requirements for the plant to be controlled.

Generally, these control pushbuttons are disconnected from the switch to be wired thereto at the time of installation.

A further solution provides that the push-button panel is integrated into the body of the switching device or designed to be applied thereto by removing an access cover and wiring the controls to the internal control circuits.

As a consequence, however, similar solutions are limited in the number of controls that can be associated with the same switch, in particular because of the limited space available, as well as in the possibility of customizing the device.

Furthermore, the need to connect the individual controls to the internal circuits of the device makes the assembly operation laborious and complex, with a consequent increase in general costs.

SCOPE OF THE INVENTION

The object of the present invention is to overcome the above-mentioned drawbacks by providing a safety switch with touch panel adapted to be applied to accesses for the control of industrial machines or plants which is characterized by high efficiency and relative cost-effectiveness.

A particular object is to provide a safety switch with touch panel that can be associated in a constructively simple manner to a plurality of commands designed to operate on one or more of the control and/or service circuits designed to verify the operation of the system.

Still another object is to provide a safety switch with touch panel which provides for the possibility of customizing the commands associated therewith.

Still another object is to provide a safety switch with touch panel that is highly safe against access openings in unsafe conditions or by unauthorized personnel.

Still another object is to provide a safety switch with touch panel which is highly safe against any disassembly attempts in the closed access condition, possibly providing evidence of any tampering or disassembly attempts.

These objects, as well as others which will appear more apparent hereinafter, are achieved by a safety switch with touch panel which, according to claim 1, comprises a switching device having a casing anchored to a fixed part to be monitored and housing switching means suitable for being operatively connected to one or more control and/or service circuits of the plant for their control and electrical and/or electronic control means suitable for being connected with one or more control and/or signalling circuits of the machine or plant, an operating device adapted to be anchored to a movable part of the access to interact with said switching means at the opening/closing of the access for opening/closing one or more of said circuits, means for detecting the opening of the access associated with said switching device and with said operating device for sending to said control means a stop command for stopping the machine or plant following the detection or the request to open access, driving means connected with said control means for sending activation/deactivation and/or signalling commands.

The driving means comprise at least one touch monitor associated with said casing and provided with one or more virtual controls and a process unit, for example a microprocessor adapted to associate to each of said virtual controls a control and/or signalling function for the association thereof by means of said control means to one of the circuits of the machine or plant.

In this way it will be possible to associate a plurality of different commands to the switch in a constructively simple manner, that is, without physically providing the controls but associating a specific function to each zone of the monitor in a programmable manner, so as to be able to customize the functions of the monitor according to the user's needs.

With the expressions "touch panel" and "touch monitor" we want to indicate a screen that also functions as an input device as it is sensitive to pressure or to the simple touch exercised by the user, both with one part of the body and with several parts of the body, or with other touch devices.

Advantageous embodiments of the invention are obtained in accordance with the dependent claims.

BRIEF DISCLOSURE OF THE DRAWINGS

Further features and advantages of the invention will become more apparent in the light of the detailed description of some preferred but not exclusive embodiments of the safety switch according to the invention, illustrated as a non-limiting example with the aid of the accompanying drawing tables, wherein.

BEST MODES OF CARRYING OUT THE INVENTION

With reference to the attached figures, three preferred but not exclusive configurations of the safety switch according to the invention are shown, which are adapted to be applied to the access of a perimeter or safety barrier placed to protect a machine or industrial plant.

In general, the access A may be suitably equipped with special electronic or electromechanical safety devices designed to interrupt the operation of the machine or plant, or part thereof, when it is opened or even only upon the unlocking thereof, or to signal that unlocking or opening has taken place in order to allow an operator to intervene, according to known methods and therefore not described in greater detail below.

Figure 1:
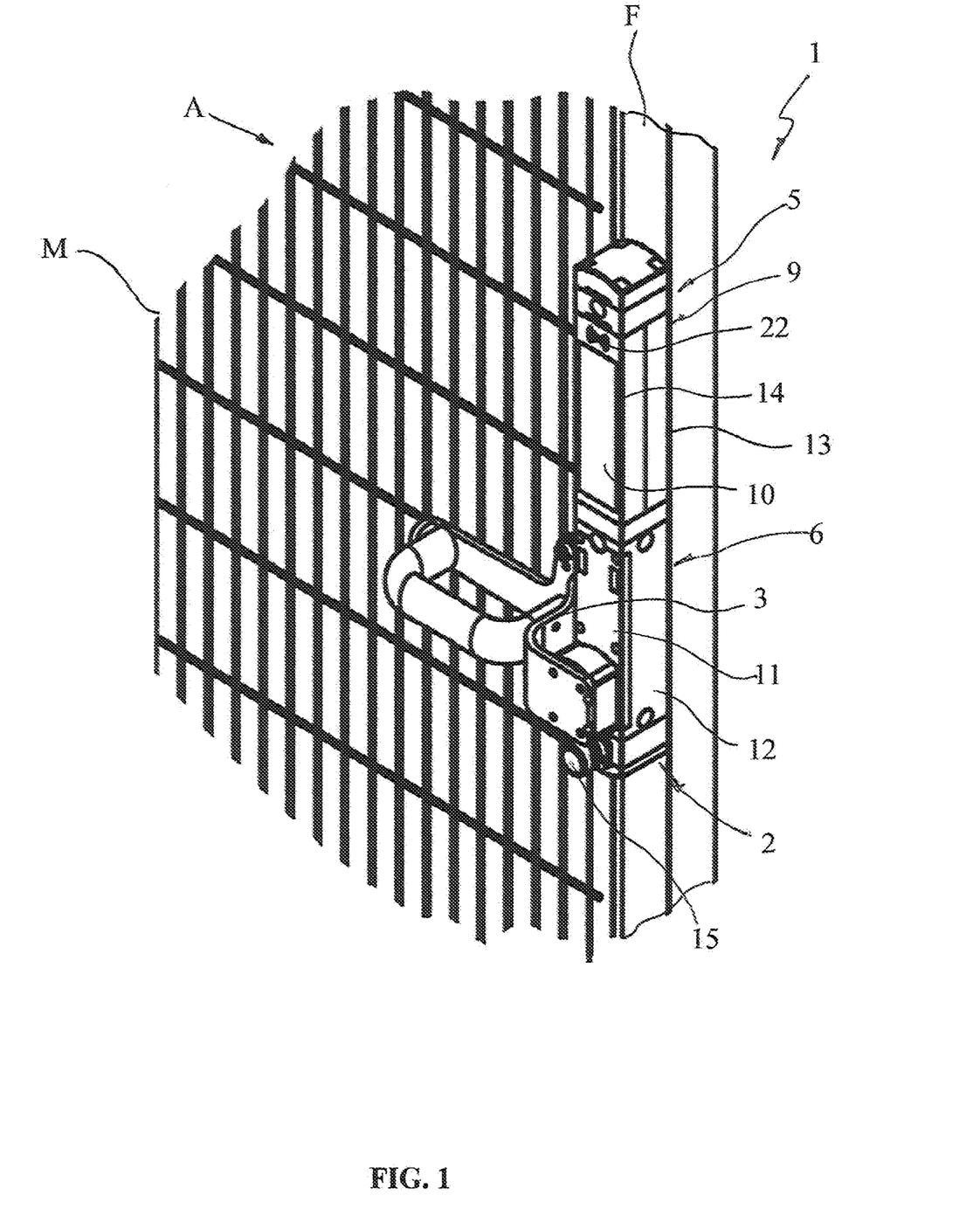
FIG. 1 is a perspective view of a switch according a first preferred embodiment and applied to an access and wherein the access is closed.
Figure 2:
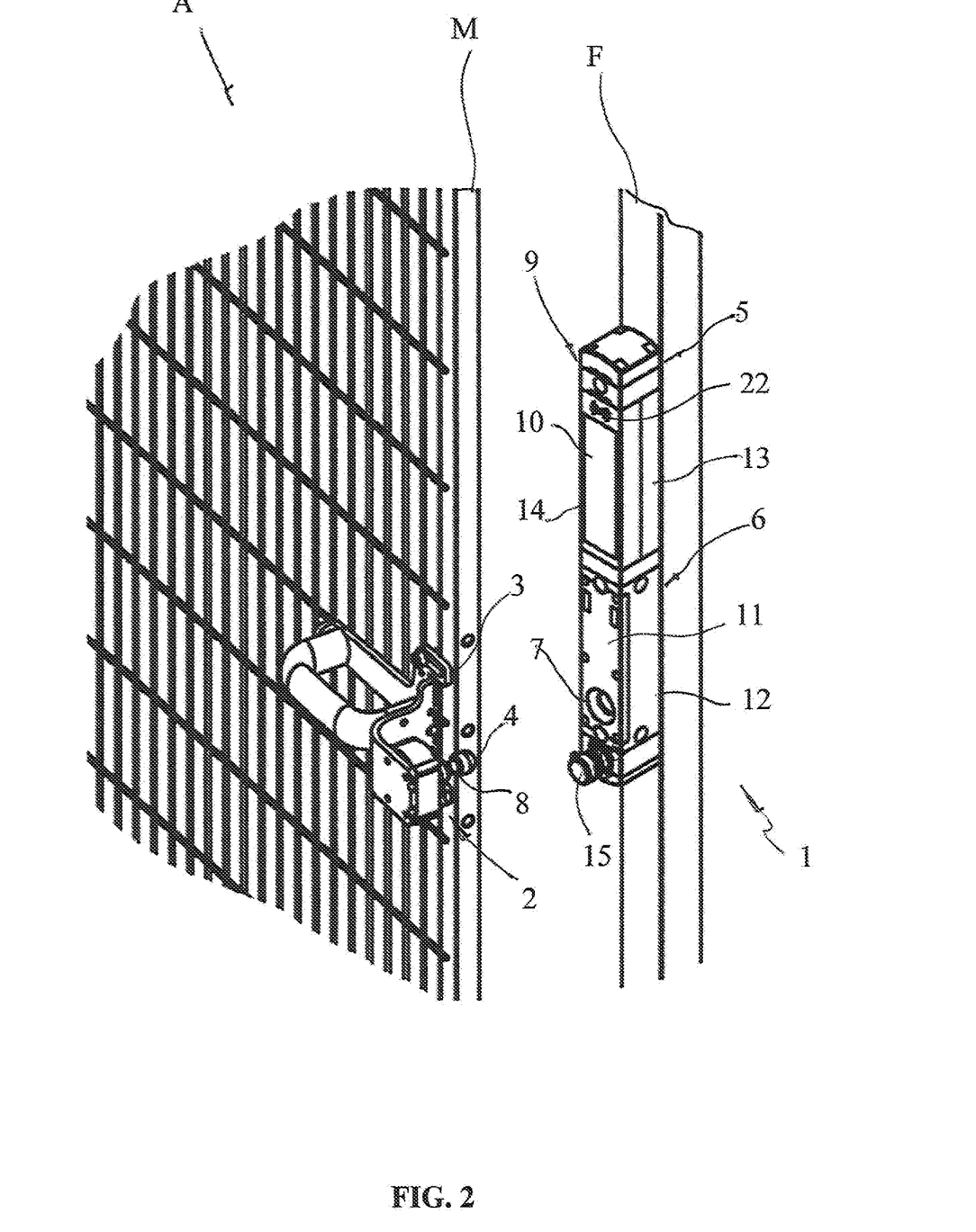
FIG. 2 is a perspective view of a switch of FIG. 1 applied to an access and wherein the access is open.

In FIGS. 1 and 2 the safety switch, globally indicated with 1, comprises an operating device 2 designed to be anchored to a movable part M of the access A to be monitored so that upon the opening of the access A it interacts, according to methods described below, with the power circuits of the machine or plant to perform an instantaneous or timed shutdown, also based on the features of the machine or plant.

In particular, the operating device 2 is provided with an anchoring body 3 designed to be fixed on the movable part M of the access A and from which a retaining element 4 is projected whose function will be described below.

The switch 1 also comprises a switching device 5 having a casing 6 adapted to be anchored to the fixed frame F of the access A to be monitored and which is provided with at least one hole 7 placed frontally for the insertion of the retaining element 4.

In a known manner, the front hole 7 will be suitably flared to recover any play and misalignments between the two components when they are assembled on the corresponding parts of the access A, so that the retaining element 4 and the hole 7 may also have centering function between the two devices 2, 5.

The casing 6 also houses thereinside locking/unlocking means, not shown, suitable for interacting with the retaining element 4 when it is inserted inside the front hole 7, to prevent its extraction from the hole 7 and the consequent possibility of opening the access A if the predefined safety conditions for the machine or plant have not been fulfilled.

The position of the hole 7 may be suitably varied also according to the insertion direction of the retaining element 4.

For example, in the case of an access A with sliding closure, the hole 7 may be arranged laterally on the casing 6 or it could always be arranged on the front face of the casing 6 which will however be arranged rotated 90° around a vertical axis with respect to the illustrated embodiment.

The configuration of the locking/unlocking means is not limitative for the present invention, since mechanisms of any type may be used to carry out the mechanical retention of the retention element 4, going to engage it mechanically by means of a retainer or retractable tooth or with a magnetic block made through an electromagnet, not shown, so as to lock it in the insertion position.

To this end, the retaining element 4 will be provided with a groove 8 suitable for being engaged by the above retainer.

The switching device 5 also houses switching means, not shown as known per se, suitable for being operatively connected to one or more control and/or service circuits of the plant for controlling them.

Inside the casing 6 there are also electric and/or electronic control means suitable for being connected with one or more control and/or signalling circuits of the machine or plant in order to send stop controls, access control, enabling and/or reporting controls.

Suitably, the retaining mechanism will be controlled by the control means that will allow it to be disengaged from the retaining and centering element 4 only when all the conditions for the safe opening of access A are fulfilled.

Safe detection means, not visible from the figures, are also provided for detecting the opening of the access A and adapted to verify that the operating device 2 is no longer close to the switching device 5 for sending to the above control means a command for safe shutdown of the machine or plant following detection of the opening of the access A.

At the same time, also on the basis of the safety degree to be conferred to the switch 1, the control means may be connected to the locking/unlocking means for stopping the machine or plant, in an instantaneous or timed manner, already following the request for releasing the retaining element 4.

The switching device 5 also comprises further driving means 9 connected to the control means and adapted to send to the latter one or more activation/deactivation and/or signalling controls for the consequent response by the circuits of the machine or plant.

In particular, the driving means 9 comprise a touch monitor 10 associated with the casing 6.

The touch monitor 10 will be provided with a plurality of virtual controls, which will then be graphically reproduced on the monitor 10, whose functions will be appropriately managed by a microprocessor connected to the monitor 10 to associate each of the virtual controls with a specific control and/or signalling function so as to associate each of these virtual controls to one of the circuits of the machine or plant by means of the control means.

In summary, each specific area of the monitor 10 will be assigned in a programmable way a specific function reproducing the function of a traditional control, such as an on/off button, a selector, a stop button, a button for sending a visual and/or sound signal, and/or to reproduce visual output signals.

Touching a specific virtual control will cause the microprocessor to send a specific signal to the control means which will operate on one or more circuits of the machine or plant in a manner completely analogous to what happens for devices with real controls, so as to perform the action associated with the virtual controls.

Preferably, the actions assigned to the virtual controls will be actions that do not have a safety function, or they will be safety controls if combined with a second external command or a specific sequence of touches on the screen.

Furthermore, according to a particular variant, the electric and/or electronic control means may comprise one or more communication buses.

The communication buses may be suitable for either transmitting data safely or in an unsafe mode, based on the type of control with which they will be associated.

According to a first variant not shown, the touch monitor 10 will be integrated on the front face 11 of the casing 6.

In the illustrated configuration, preferred but not exclusive, the casing 6 comprises a first shell 12 housing the switching means, and possibly the control means, and a second shell 13 anchored to the first shell 12 and wherein the touch monitor 10 is integrated.

The first shell 12 and the second shell 13 may be integral to each other or be two distinct elements anchored permanently to each other or, again, they may be connected in an orientable manner so that they may be rotated relative to each other around a vertical axis to place them in the most comfortable position for the user, or simply side by side, without any connection.

For example, in the case of access A with sliding opening, it will be possible to have the touch monitor 10 placed frontally while the first shell 12 will be rotated 90° with respect to what is illustrated to arrange the hole 7 laterally and allow the insertion of the retaining element 4, which in turn will protrude from the anchoring body 3 along the sliding direction of the access A.

For greater convenience and immediacy of use, the touch monitor 10 will be placed, possibly integrated, on the front face 14 of the second shell 13, so as not to present obstacles interposed between the operator and the switching device 5.

The switching device 5 may also be provided with an auxiliary release command 15, mechanical or electronic, such as, for example, a service or emergency command suitable for interacting with the switching means for controlling the circuits of the machine or system, such as a selector, a mushroom-head, cable emergency control, a key release or similar, mechanically connected to the locking/unlocking means for the emergency stop of the machine.

The auxiliary release control 15 will preferably be arranged on the front face 11 of the casing 6, in particular of the first shell 12, to be easily accessible, even if other positions may be provided.

The detection means, not shown, comprise a transmitter associated with the anchoring body 3 of the operating device 2 and adapted to send a presence signal and at least one receiver associated with the casing 6 of the switching device 5 and adapted to receive the presence signal when the distance between the operating device 2 and the casing 6 is at least equal to a predetermined minimum value sufficient to make access A be closed and thus send this presence signal to the control means which can authorize the start of the system, if any further safety conditions have been fulfilled.

By way of example, the transmitter will be a transponder or tag/RFID (Radio Frequency Identification) which will send a unique identification signal to the RFID receiver or antenna.

This tag/RFID may be replaced with other mechanical key or electronic recognition systems such as data transmission via radio, via Hall effect, through magnetic fields, via ultrasound or the like.

Advantageously, the RFID tag will be coded so that it may be uniquely recognized by the control means connected to the receiver or antenna and prevent the use of actuators other than switch 1, avoiding the risk of unsafe openings of access A, according to known methods and described for example in WO2013098788.

The way of connecting the RFID tag to the anchor body 3 are not limiting and are not described in more detail. For example purposes only, the RFID tag may be housed in a special seat, not shown, made inside the anchor body 3.

Advantageously, to further increase the safety level of switch 1 and prevent unauthorized inputs, the control means may also comprise an identification device 22 for the operators authorized to intervene on the control means.

In particular, on the casing 6, for example on its front face 11 as in the figures or in any other part, an RFID reader for operator recognition will be positioned to dialogue with a token provided with an identification code and in possession of the operator.

The identification device 22 may be designed on multiple recognition levels, so as to enable certain functions in a differentiated manner for the different programmed levels.

The RFID reader 22 will be connected to the control means to receive as input the identification code to be sent to the control means for its comparison with a stored verification code.

As an alternative to the reader-token coupling, it will also be possible to use other types of recognition systems, both mechanical, for example by means of keys, and through electronic systems, for example through the recognition of biometric parameters.

According to further variants, additional devices may be applied to the casing 6, such as indicator lights, selectors, potentiometers, emergency buttons, buzzers, badge readers for access control, fingerprint readers, iris readers, biometric readers or cameras for facial recognition and similar and/or a different number of buttons.

Figure 3:
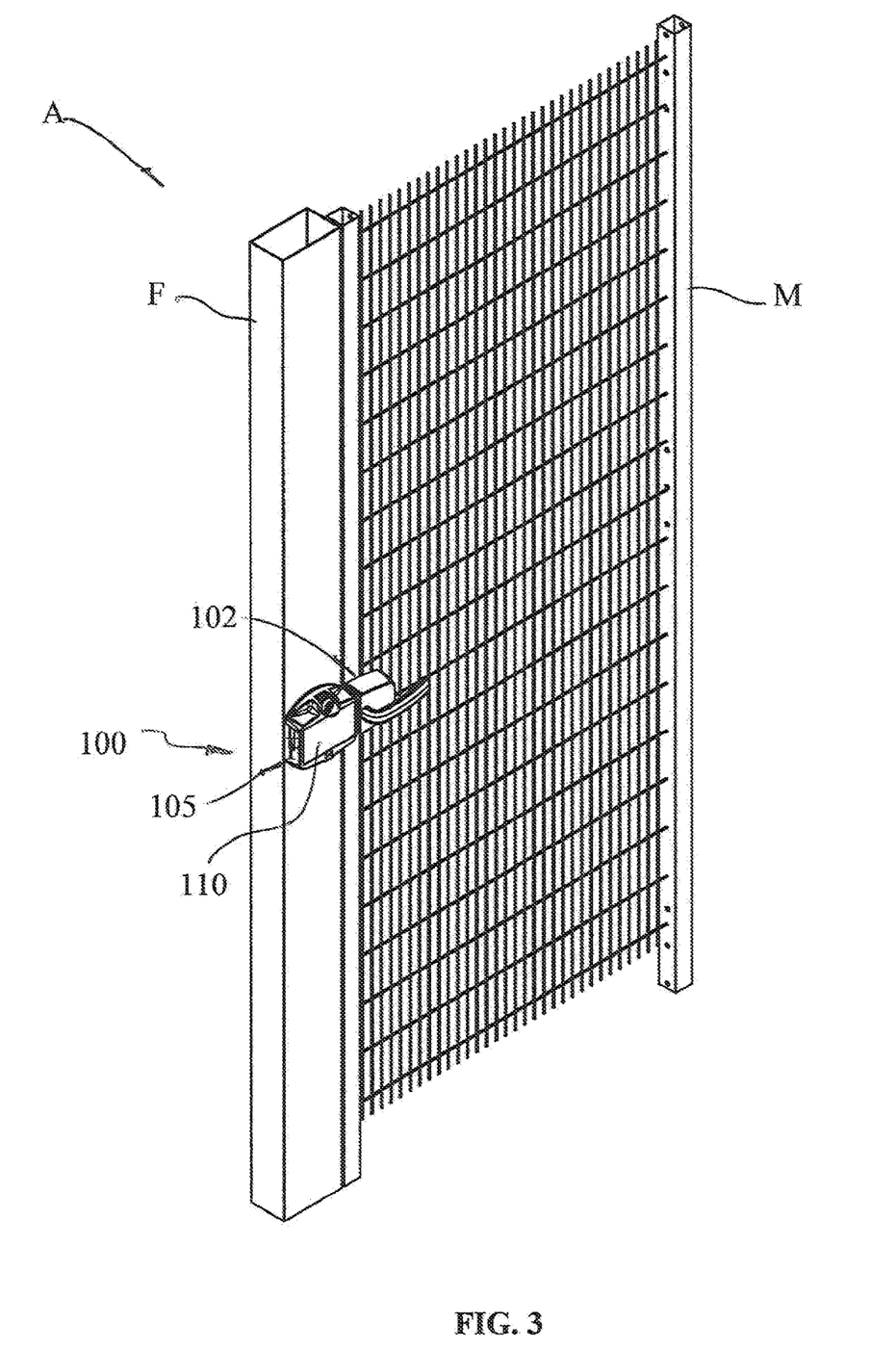
FIG. 3 is a perspective view of a switch according a second preferred embodiment provided with a handle and applied to an access and wherein the access is closed.
Figure 4:
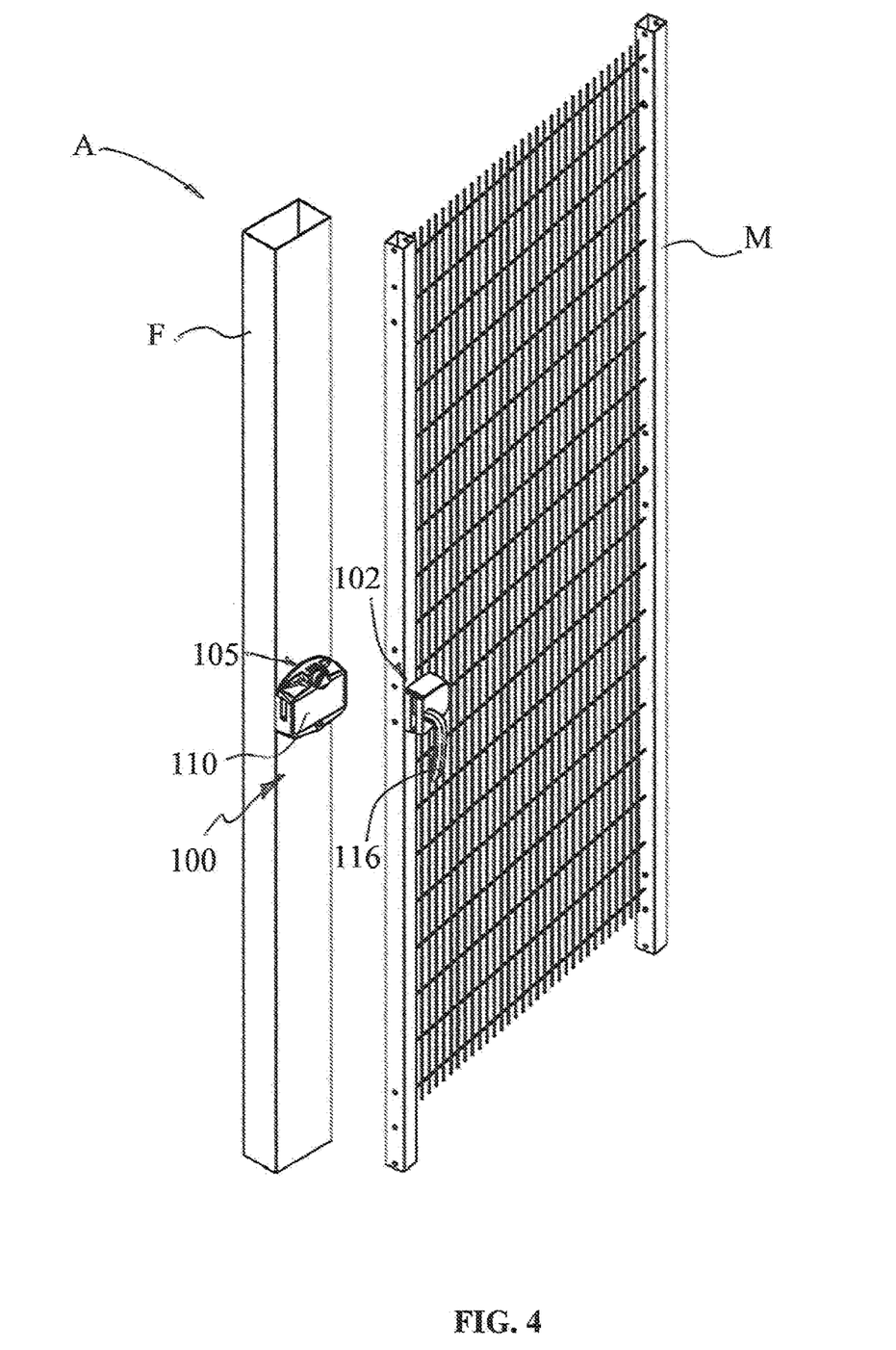
FIG. 4 is a perspective view of a switch of FIG. 3 applied to an access and wherein the access is open.

In FIGS. 3 and 4, a second configuration of the switch is shown, indicated overall with 100, which comprises an operating device 102 provided with an anchoring body 103 to the movable part M of the access A to be monitored on which is mounted a handle 116 suitable for be grasped by a user for moving the movable part M of access A.

According to the preferred but not exclusive embodiment of the figures, the handle 116 will be mounted movable on the anchoring body 103 and adapted to move between at least two positions with respect to the anchoring body 103.

By way of example, the handle 116 may be hinged to the anchoring body 103 so that it can be lowered and raised in a manner similar to what happens with the common lever handles, or it may be of the sliding type or of the rotating knob type, without particular limitations.

The handle 116 will be connected, by means of a suitable transmission mechanism not shown, to a retaining element, for example a pin or bolt 104, housed movable inside the anchoring body 103 and having the function of retaining and possible centering element.

In this way, following the movement of the handle 116 from a first raised position, shown in FIG. 3, to a second lowered position, shown in FIG. 4, the bolt 104 may move from an extracted position of access A closed, but not necessarily blocked, at a position at least partially retracted inside the anchoring body 103 wherein the access A is suitable to be open.

In a not shown manner, the handle 116 may be associated with a first elastic return mechanism adapted to bring it automatically from the second lowered position to the first raised position also with the bolt 104 locked in the extracted position, in a manner substantially similar to the common door handles.

According to a not shown variant, the handle 116 may be fixed with respect to the anchoring body 103, for example made in one piece, and in this case the bolt 104 may simply move due to the stress transmitted by contact with the part of the switch 100 anchored to the fixed part F of access A.

The bolt 104 may in turn be associated with a second elastic return mechanism which will act to bring it back from the at least partially retracted position towards the extracted position so that it may always be in the extracted position to be retracted only following the action of the handle 116 or an inward thrust produced by contact with the part of the switch 100 anchored to the fixed part F of the access A.

According to a further variant, not shown, the extraction and retraction movement of the bolt 104 may be operated by an electromechanical mechanism remotely controlled or by means of a command button located on the anchor body 103 or on the handle 116.

The switch 100 also comprises a switching device 105 having a casing 106 adapted to be anchored to the fixed frame F of the access A to be monitored and which is provided with at least one side hole 107 for the insertion of the bolt 104.

The casing 106 also houses inside locking/unlocking means, not shown, suitable for interacting with the bolt 104 when it is inserted inside the side hole 107 in its position of complete extraction, to prevent its return to the retracted position or vice versa.

Advantageously, the casing 106 may be provided with two holes 107 placed on lateral faces 117, 118 opposite each other so that the bolt 104 may be selectively inserted in one of the two holes 107 to interact with the locking/unlocking means from the right or from the left, depending on whether the anchoring body 103 is mounted on the right or left with respect to the switching device 105.

Figure 5:
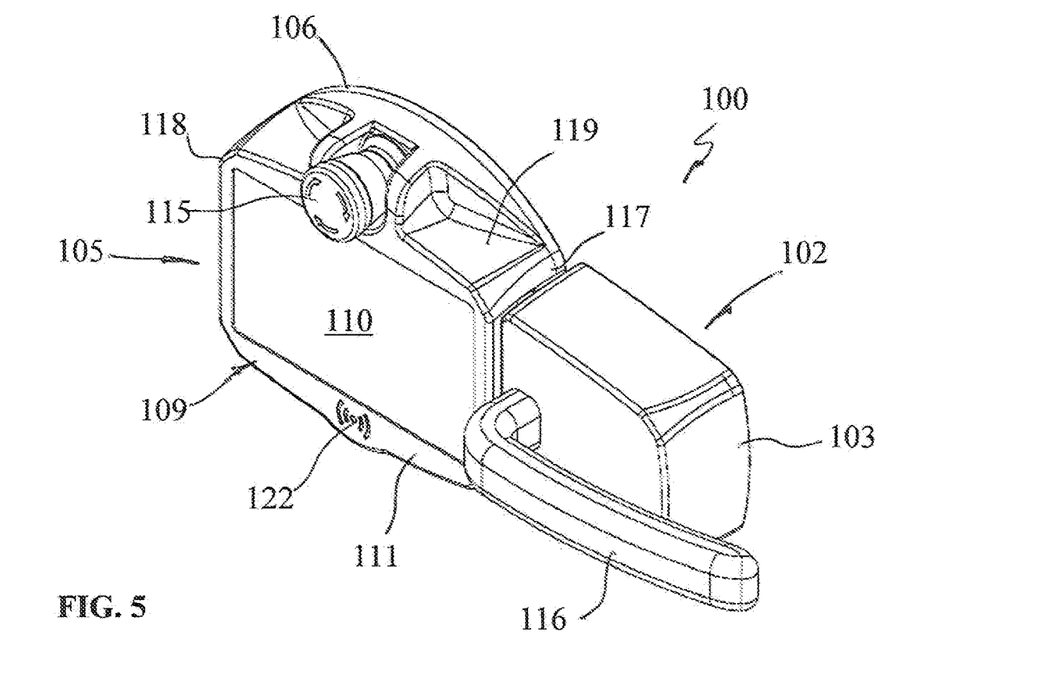
FIG. 5 is a perspective view of a switch of FIG. 3 wherein the access is closed.
Figure 6:
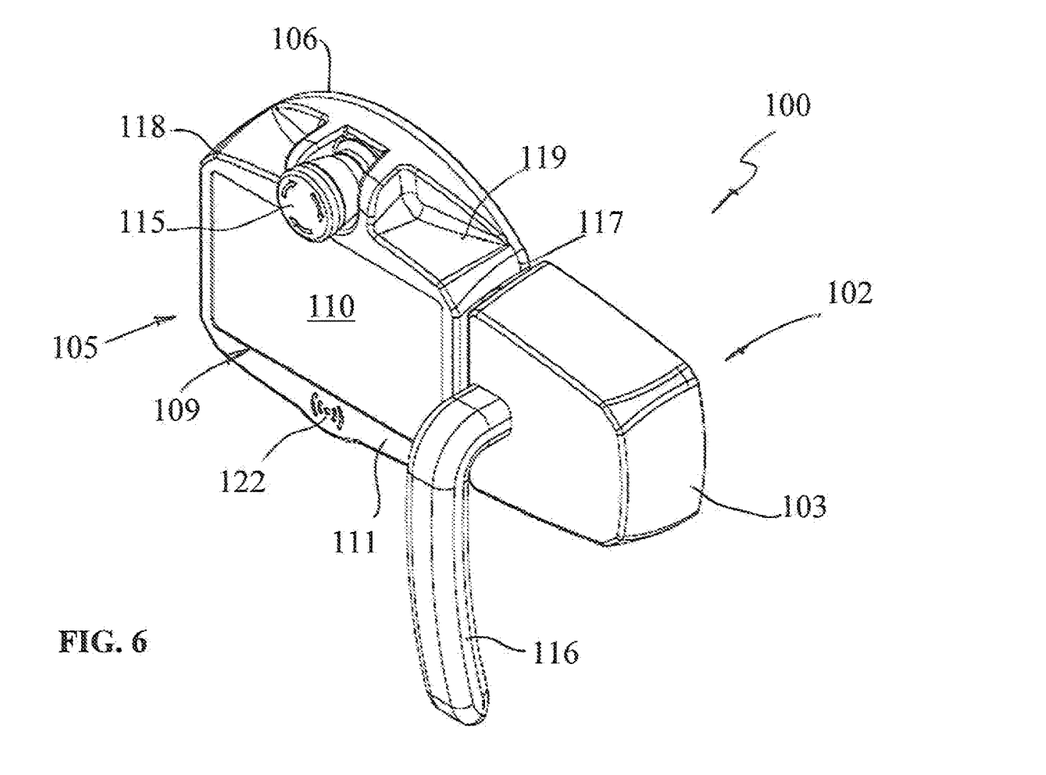
FIG. 6 is a perspective view of a switch of FIG. 3 wherein the access is open.
Figure 7:
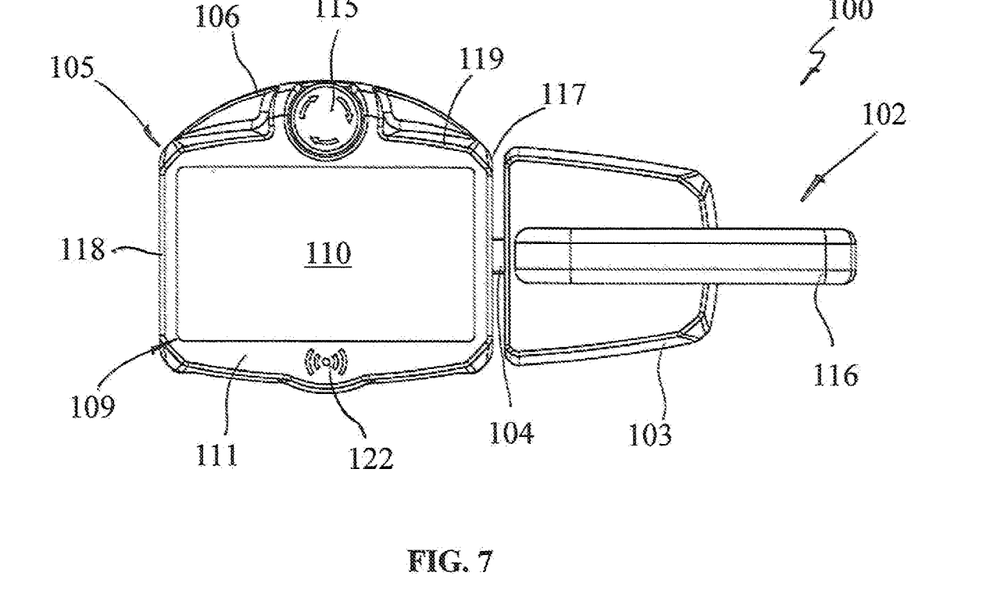
FIG. 7 is a front view of the switch of FIG. 3.
Figure 9:
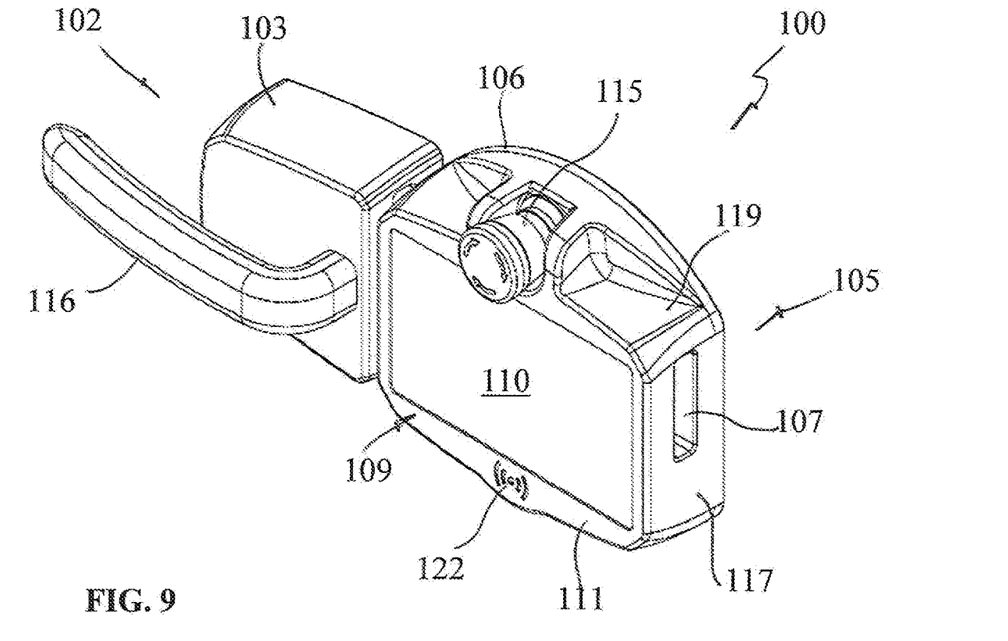
FIG. 9 is a perspective view of a switch provided with a handle in a third preferred embodiment wherein the access is closed.
Figure 10:
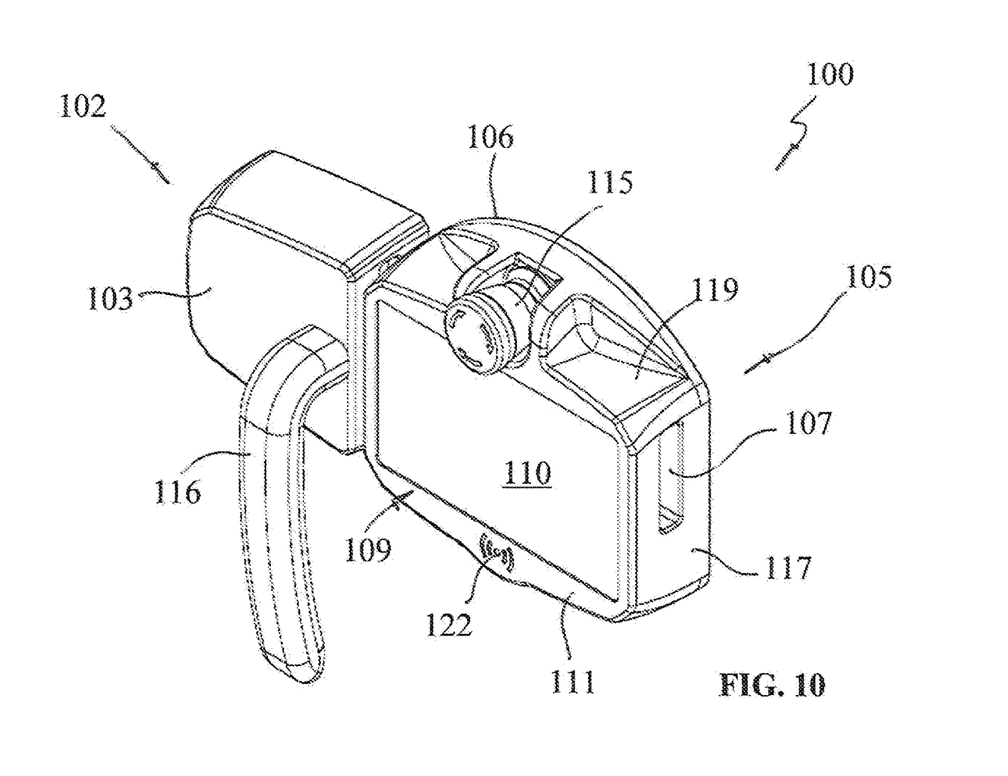
FIG. 10 is a perspective view of the switch of FIG. 9 wherein the access is open.

FIGS. 5 and 6, in fact, show a switch 100 wherein the handle 116 is mounted on the right of the switching device 105 while FIGS. 9 and 10 instead show a switch 100 wherein the handle 116 is substantially identical to the previous one but mounted to the left of the switching device 105.

According to not shown variants, the inlet hole 107 for the bolt 104, or the holes, may be made on the front face 111 or on one or both of the upper faces 119 and lower faces 120 of the casing 106.

In this case the bolt 104 may protrude from the anchoring body 103 laterally or from the front.

The bolt 104 may have the end designed to be inserted into the hole 107 of the casing 106 suitably flared or rounded to facilitate the recovery of any misalignments between the two parts of the switch 100 and thus also act as a centering element.

The configuration of the locking/unlocking means is not a limitation for the present invention, since mechanisms of any type may be used to carry out mechanical retention of the bolt 104, engaging it mechanically by means of a retaining element to lock it in the extracted position of closed access.

To this end, the free end of the bolt 104 may be provided with a groove or slot suitable for being engaged by the retaining element of the locking/unlocking mechanism.

Electrical and/or electronic control means are suitably arranged in the casing 106 to be connected with one or more control and/or signalling circuits of the machine or plant in order to send stop, enabling and/or signal commands, also via safe or unsafe communication buses.

Suitably, the retention mechanism will be controlled by the control means that will allow it to be released from the bolt 104 only when all the safety conditions for the opening of access A have been verified.

Figure 8:
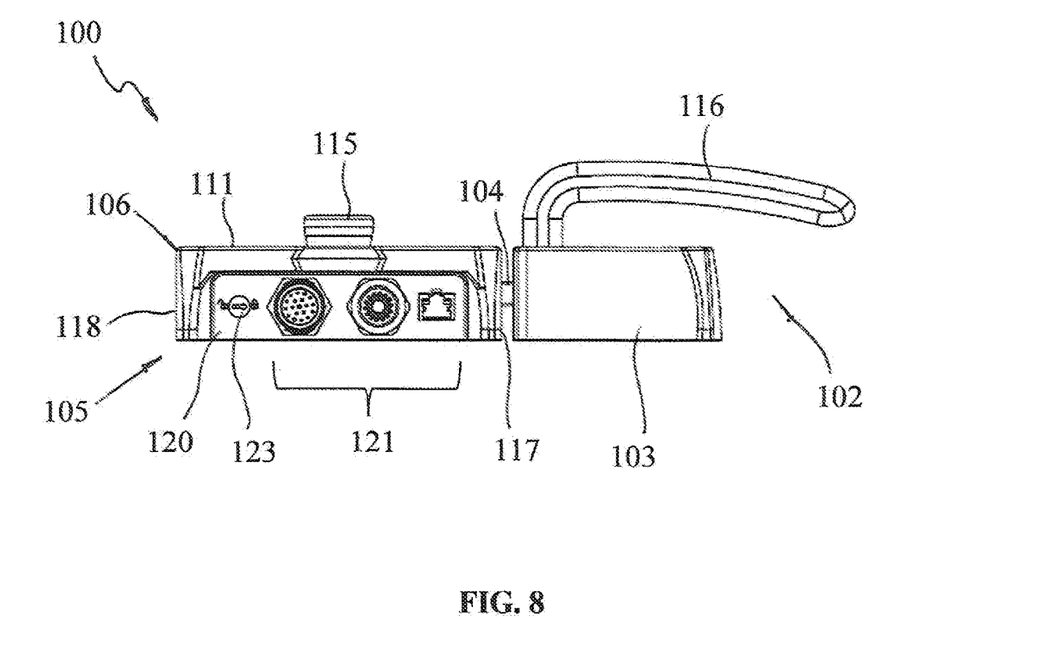
FIG. 8 is a bottom view of the switch of FIG. 3.

As shown in FIG. 8, the casing 106 will be provided with one or more connectors 121, for transferring data, electrical signals and power supply or, further, further devices such as a selector 123 which can be operated manually by means of a suitable tool for the mechanical release of the bolt 104.

There are also detection means, not visible from the figures and similar to those described for the previous configuration, for detecting the opening of the access A and adapted to verify that the movable anchoring body 103 is no longer close to the fixed casing 106, sending to the above control means a stop command of the machine or plant following the detection of the opening of access A.

At the same time, also on the basis of the safety degree to be assigned to the switch 100, the control means may be connected to the locking/unlocking means to carry out the shutdown of the machine or plant, in an instantaneous or timed manner, already upon the unlocking of the bolt 104 or to send access request signals and subsequent stopping of the machine or system.

The operating device 103 also comprises further driving means 109 connected to the control means and adapted to send to the latter one or more activation/deactivation and/or signalling commands for the consequent response by the circuits of the machine or plant.

In particular, the driving means 109 comprise a touch monitor 110 associated with the casing 106 and which in the preferred but not exclusive configuration of the figures is integrated in the front face 111 thereof.

The touch monitor 110 will be provided with a plurality of virtual controls, which will then be graphically reproduced on the monitor 110, whose functions will be appropriately managed by a microprocessor connected to the monitor 110 to associate each of the virtual controls with a specific control and/or signalling function for its association by means of the control means to one of the safe or unsafe circuits of the machine or plant.

In summary, at each specific area of the monitor 110 a specific function reproducing the function of a traditional command, such as an on/off button, a selector, a stop button, a button for sending a visual and/or sound signal and/or visual output signals, such as warning signals, alarms, information on the operation of the machine, on the access status, also reproducing video with or without audio and with the possibility of having more screens sliding always by touch, will be assigned in a programmable way.

Touching a specific virtual control will cause the microprocessor to send a specific signal to the control means which will operate on one or more circuits of the machine or plant in a manner completely analogous to what happens for devices with real commands, so as to carry out the action associated with the virtual control.

The actions referred to the virtual controls may be both actions that do not have a safety function and actions that have a safety function.

For greater convenience and immediacy of use, the touch monitor 110 will be placed, possibly integrated, on the front face of the casing, so as not to present obstacles between the switch and the operator.

According to other variants, multiple monitors may be arranged positioned distant from each other and on different faces of the casing.

For safety reasons, the switching device 105 will also be equipped with a physical emergency button, preferably an emergency mushroom 115 mechanically connected to the locking/unlocking means for the emergency stop of the machine.

The emergency button 115 will preferably be arranged on the front face 111 of the casing 106 to be operated immediately, although other positions may be provided.

The detection means, not shown, comprise a transmitter associated with the anchoring body 103 and adapted to send a presence signal and at least one receiver associated with the casing 106 and adapted to receive the presence signal when the distance between the anchoring body 103 and the casing 106 is at least equal to a predetermined value sufficient to consider access A closed and thus send this presence signal to the control means which may authorize the start of the system, if all any further safety conditions have been verified.

By way of example, the transmitter will be a transponder or tag/RFID (Radio Frequency Identification), or any other means of transmission, which will send a unique identification signal to the RFID receiver or antenna.

Advantageously, the RFID tag will be coded so that it may be uniquely recognized by the control means connected to the receiver or antenna and prevent the use of actuators other than switch 100, avoiding the risk of unsafe openings of access A, according to known methods and described for example in WO2013098788.

The way of connecting the RFID tag to the anchoring body 3 are not limiting and are not described in more detail. For example only, the RFID tag may be locked in a special seat, not shown, made inside the anchoring body 103.

Advantageously, also in this case to further increase the safety level of the switch 100 and prevent unauthorized accesses, the control means may also comprise an identification device 122 of the operators authorized to intervene on the control means, provided with an RFID reader for operator recognition adapted to dialogue with a token provided with a recognition code and in possession of the operator.

The aesthetic and structural configuration of the anchoring body 103 and the relative handle 116 may vary according to requirements.

For example, according to a first variant, the anchoring body 103 may consist of an anchoring bracket to the movable part M of the access A and a covering shell suitable for being fixed to the bracket by means of screws, pins or similar anchoring organs, or snap couplings.

According to a further variant, the bracket may be composed of only the shell provided with the handle 116.

In addition, the fixing elements of the anchoring body 103 may be provided with sealing means, not shown, suitable to cover them and prevent access thereto and to give evidence of their possible removal by unauthorized personnel.

For example, the sealing means may be anti-burglary caps placed inside the holes of the anchoring body 103 designed to house the connecting members.

The anti-burglary caps will be snugly fitted in the corresponding through holes so as to not present any element that may facilitate their extraction and will be designed to break if they are removed, so as to prevent their re-insertion and give immediate evidence of the attempt to remove.

In this way it will not be possible to remove the anchoring body 103 or to disassemble its parts without leaving a trace of a similar action.

Similar fixing members and relative sealing means may also be associated with the switching device 105.

In this way, the switch 100 will always be adequately protected against any actions aimed at its removal or dismantling, even partial, and which could lead to access A in an unsafe condition.

The switch according to the invention is susceptible of numerous modifications and variations, all of which are within the inventive concept expressed in the attached claims. All the details may be replaced by other technically equivalent elements, and the materials may be different according to requirements, without departing from the scope of protection of the present invention.

The invention claimed is:

1. A safety switch for monitoring access to machines or industrial plants to stop the machines or industrial plants upon the opening of said access, the safety switch, the safety switch comprising:
- a switching device (5, 105) having a casing (6, 106) adapted to be anchored to a fixed part (F) of the access (A) to be monitored and housing switching means adapted to be connected to one or more control and/or service circuits of the machine or plant for the control thereof and electric and/or electronic control means adapted to be connected with one or more control and/or signalling circuits of the machine or plant;
- an operating device (2, 102) adapted to be anchored to a movable part (M) of the access (A) to interact with said switching means when the access (A) is opened/closed for the opening/closure of one or more of said circuits and operating shutdown of the machine or industrial plant upon the opening of the access (A);
- means for detecting the opening of the access (A) associated with said switching device (5, 105) and with said operating device (2, 102) for sending a stop command of the machine or plant to said control means upon the detection or request for the opening of the access (A);
- wherein said switching device (5, 105) comprises driving means (9, 109) connected to said control means for sending activation/deactivation and/or signalling controls;
- wherein said driving means (9, 109) comprise at least one touch monitor (10, 110) integrated into said casing (6, 106) and provided with one or more virtual controls associated to respective actions and at least one microprocessor suitable for associating said one or more virtual controls with a control and/or signalling function and to associate one or more of said virtual controls to one of the circuits of the machine or plant by means of said control means.

2. The safety switch as claimed in claim 1, wherein said at least one touch monitor (10, 110) is placed on a face (11, 111) thereof.

3. The safety switch as claimed in claim 1, wherein said operating device (2, 102) comprises a retaining element (4, 104) adapted to be inserted, at the closure of said access (A), into a hole (7, 107) made in said casing (6, 106) to interact with locking/unlocking means housed in said casing (6, 106) and adapted to engage said retaining element (4, 104) to prevent it from being extracted from said casing (6, 106).

4. The safety switch as claimed in claim 1, wherein said retaining element (104) is a pin or bolt movable in said operating device (102) to pass from an extracted position of closed access (A) to a position at least partially retracted inside said operating device (102) and in which the access (A) can be opened, said operating device (102) comprising an anchoring body (103) and a handle (116) mechanically connected to said retaining element (104) and movably mounted on said anchoring body (103) to move between at least one first and one second position with respect to said anchoring body (103) and to carry said retaining element (104), following the movement from said first position to said second position, from said extracted position to said at least partially retracted position.

5. The safety switch as claimed in claim 1, wherein said casing (6, 106) comprises a pair of said holes (7, 107) placed on mutually opposite faces thereof for selective insertion of said retaining element (4, 104) and its interaction with said locking/unlocking means.

6. The safety switch as claimed in claim 1, wherein said casing (6, 106) comprises an auxiliary release command (15) and/or emergency button (115).

7. The safety switch as claimed in claim 1, wherein said detection means comprise a transmitter associated with said operating device (2, 102) and adapted to send a presence signal and at least one receiver associated with said switching device (5, 105) and adapted to receive said presence signal when the distance between said devices (2, 5; 102, 105) is at least equal to a predetermined value sufficient to allow access (A) to be held closed to send said presence signal to said control means.

8. The safety switch as claimed in claim 1, wherein said locking/unlocking means comprise an identification device (22, 122) of the operators authorized to intervene on said control means and comprising an RFID tag connected to said control means for receiving as input an identification code to be sent to said control means for its comparison with a memory verification code.

9. The safety switch as claimed in claim 1, wherein said locking/unlocking means comprise a mechanical retention mechanism adapted to engage and lock said retaining element (4, 104) in said extracted position of closed access (A).

10. The safety switch as claimed in claim 1, wherein said electric and/or electronic control means comprise one or more communication buses for data transmission.

* * * * *